H. SMITH.
APPARATUS FOR ELECTROCUTING ANIMALS.
APPLICATION FILED FEB. 17, 1912. RENEWED MAR. 24, 1913.

1,075,995.

Patented Oct. 14, 1913.

3 SHEETS—SHEET 1.

UNITED STATES PATENT OFFICE.

HUNTINGTON SMITH, OF DEDHAM, MASSACHUSETTS.

APPARATUS FOR ELECTROCUTING ANIMALS.

1,075,995.　　　　　Specification of Letters Patent.　　Patented Oct. 14, 1913.

Application filed February 17, 1912, Serial No. 678,229.　Renewed March 24, 1913.　Serial No. 756,563.

*To all whom it may concern:*

Be it known that I, HUNTINGTON SMITH, of Dedham, in the county of Norfolk and State of Massachusetts, a citizen of the United States, have invented a new and useful Improvement in Apparatus for Electrocuting Animals, of which the following is a full, clear, and exact description, reference being had to the accompanying drawings, forming a part of this specification, in explaining its nature.

My invention relates to an apparatus for killing animals by electricity and is especially adapted for killing cats or other small animals.

Among the objects of my invention is to provide an apparatus which is easy to operate and by which the animal may be killed quickly and humanely and with practically no danger to the operator.

The construction embodying my invention can best be seen and understood by reference to the drawings, in which—

Figure 1:
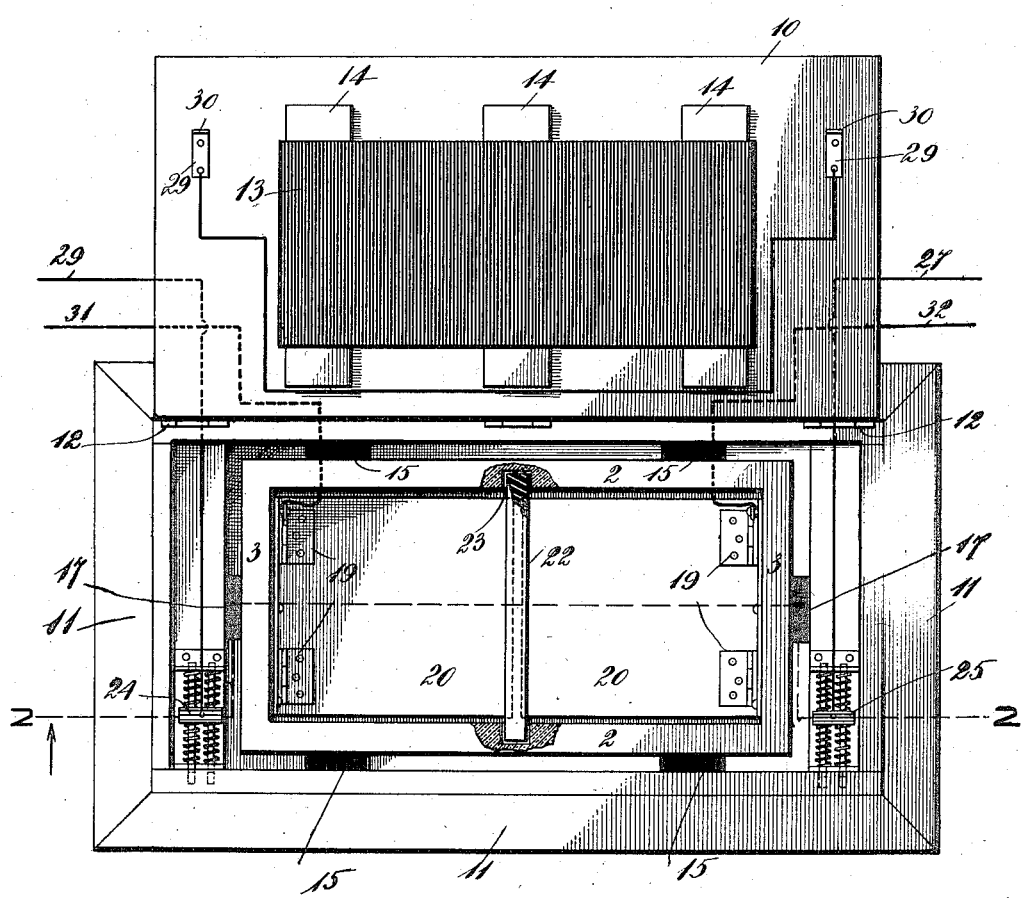
Figure 2:
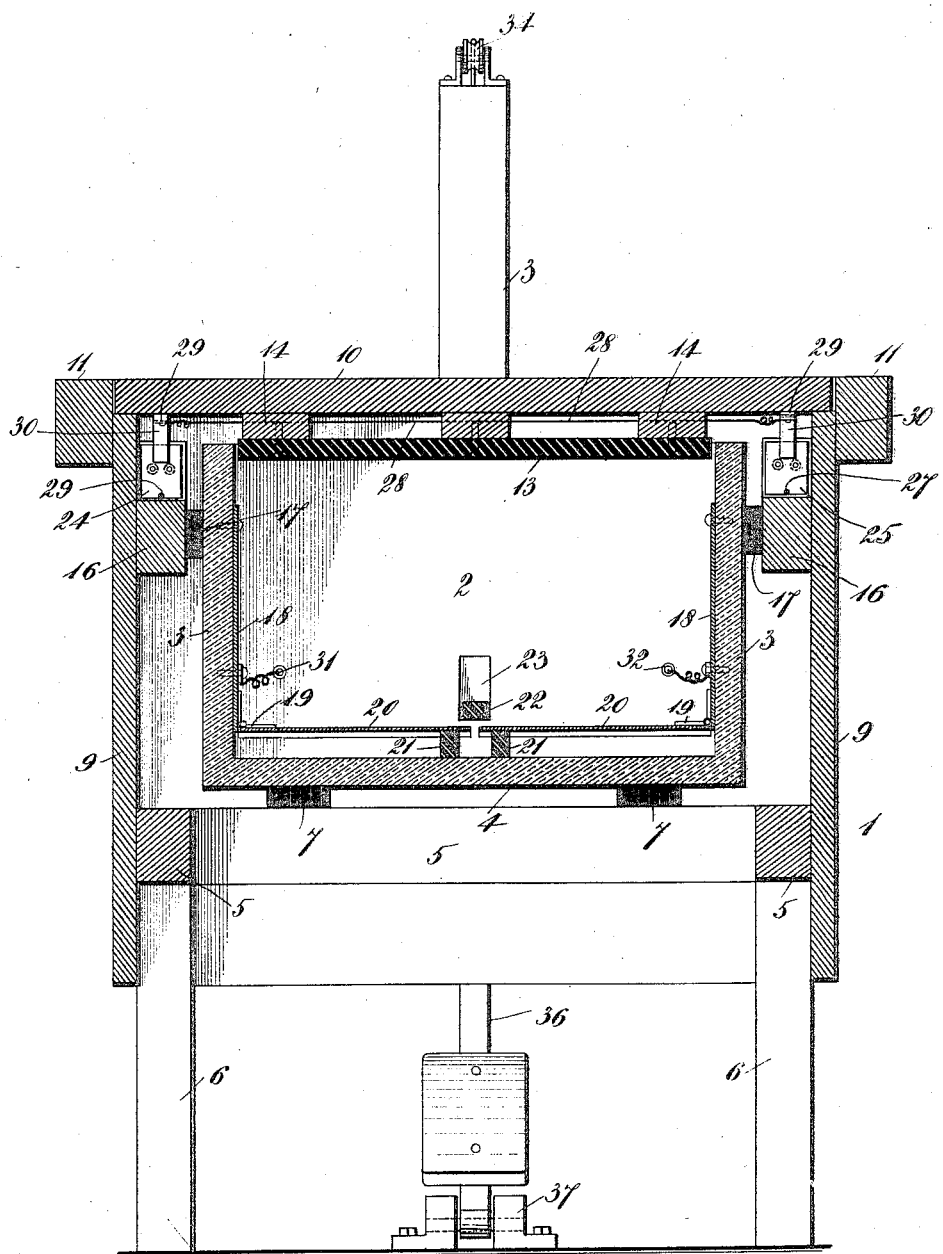
Figure 3:
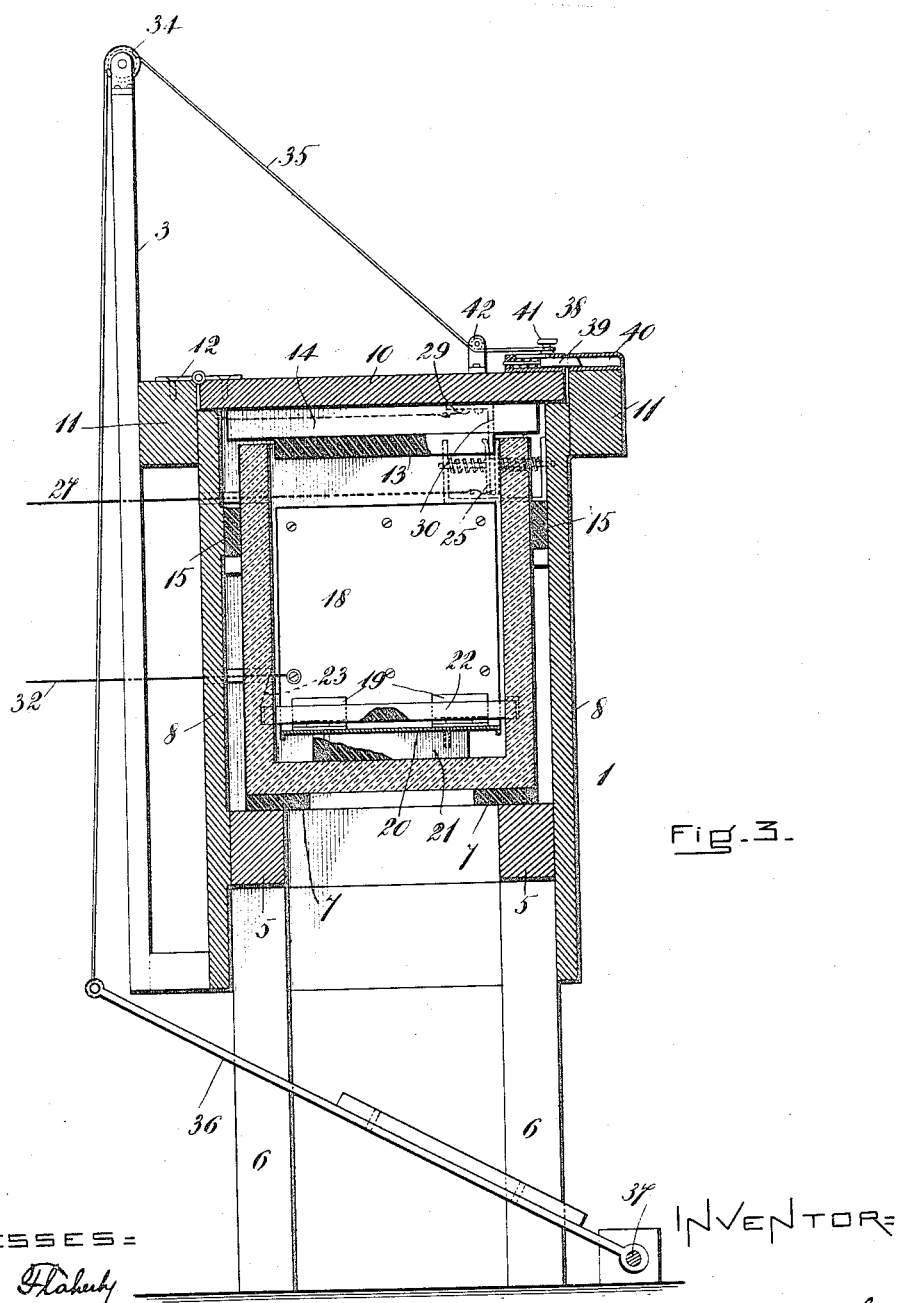

Figure 1 shows a plan of the apparatus looking at the same from the top side thereof with the cover open. Fig. 2 is a section taken on the line 2—2 of Fig. 1, and Fig. 3 is a vertical cross section of the apparatus with a portion thereof shown in side elevation.

In the drawings:—1 represents a cage of boxlike structure and constructed as follows: The interior of the cage comprises a receptacle having sides 2, 2, ends 3, 3, a bottom 4 and an open top. It is in this receptacle that the animal is placed. The receptacle is made of some waterproof material having a relatively high electrical resistance and preferably of slate. The receptacle rests upon a base consisting of bars 5 rectangularly arranged to form a supporting frame and preferably mounted upon legs 6. Insulating blocks 7 are preferably interposed between the bottom of the receptacle and the bars 5 on which the receptacle rests, these blocks being fixed in any suitable manner.

It is to be observed that the interior receptacle is somewhat smaller than the base on which it rests, the bars 5 of the base extending beyond the sides and ends of the receptacle in order to provide a base or support for an exterior receptacle or cover which is built around, spaced and insulated from the interior receptacle. This outer receptacle or cover comprises sides 8, 8, ends 9, 9, and a lid 10. Of these parts the sides and ends are secured to the bars 5 of the base to extend upwardly and around the interior receptacle and to a point beyond the top edge thereof. At their upper ends the sides and ends 8 and 9 are bound and reinforced by a rectangular frame consisting of bars 11 which form an outer top edging to the outer receptacle and extending beyond the top edge of the sides and ends thereof. It is to one of the side bars 11 of this edging that the lid 10 is secured by hinges 12 to fit down when closed against the top edges of the sides and ends 8 and 9 of the outer receptacle or cover, thus closing the entry into the interior receptacle though spaced therefrom.

The chamber of the inner receptacle is insulated from the lid 10 by means of a plate 13 of some non-conducting material such as glass. This is spaced from the under side of the lid though secured thereto by interposed blocks 14 and in a manner whereby the insulating plate 13 will enter the open top end of the inner receptacle closing the same when the lid is in a closed position, the chamber thereof then becoming entirely closed.

To further provide for the insulated maintenance and support of the inner receptacle there are interposed between its sides and the spaced sides of the outer receptacle or cover, insulating blocks 15 which act also to prevent lateral displacement of the inner receptacle. These blocks may be secured in any suitable manner. Between the ends 3 of the inner receptacle and the adjacent spaced ends 9 of the outer receptacle are placed ribs 16 which are secured to the ends 9 of the outer receptacle and between which and the ends of the inner receptacle are placed insulating blocks 17, these parts preventing endwise displacement of the inner receptacle as well as assisting in the insulation thereof. The insulating blocks 17 may be secured in any suitable manner.

To the inside of each end of the inner receptacle is attached a metallic plate 18. Connecting respectively with these plates and preferably by a hinged connection 19 are other metallic or conducting plates 20 which are adapted to assume a downturned position parallel with the bottom of the inner receptacle and separated from it by means of insulating blocks or strips 21 on which the plates rest. These plates form the floor of the inner receptacle. The plates 20 are of such length that the outer edges thereof will be separated from one another a distance sufficiently great to prevent cross-circuiting when the two plates 20 are forming a portion of an electric circuit of relatively high intensity. Directly over the space dividing the plates 20 is a bar 22 of some non-conducting material running cross-wise the interior receptacle and resting in slots 23 cut in the respective sides thereof.

Electrical connection is established through the cage in the following manner: Arranged upon the blocks or bars 16 of the outer receptacle just beneath the outer edge of the lid 10 when in a closed position are spring contact members 24 and 25, respectively. With these members connect low tension wires 26 and 27 of an electric circuit. The electric circuit is completed through the wires 26 and 27 by a wire 28 running alongside the inner face of the lid 10. This wire 28 at its opposite ends connects with fixtures 29 secured to the inner face of the lid to assume a position adjacent the spring contact members 24 and 25 when the lid is closed. Each of the fixtures 29 is provided with a finger 30 which is adapted to have electrical contact with the respective spring contact members 24 and 25 when the lid is closed, the electric circuit then being established through the low tension wires 26, 27 and 28. These low tension wires lead to a transformer (not shown) of suitable capacity to provide a secondary current of the required intensity. This secondary current enters the cage through high tension wires 31 and 32, respectively, which connect with the plates 18 secured to the interior of the inner receptacle as aforesaid, these plates 18 being in electrical contact with the plates 20 at the bottom of the inner receptacle through the hinged connections 19.

The lid 10 may of course be operated by hand, but for convenience I prefer that it be operated by the foot and have accordingly provided therefor in the following manner: Secured to the rear side of the cage is an upwardly-extending bar or upright 33 bearing at its upper end a pulley 34. Passed around this pulley is a rope 35. One end of this rope connects with a treadle 36 having a flexible or hinged connection 37 at a point adjacent the front of the cage, or, in other words, where the treadle may be easily operated by one standing in front of the cage. The other end of the rope 35 connects with the lid 10 at the front of the top edge thereof. In the construction shown, however, the rope does not connect directly with the lid but with a latch 38 which acts to hold the lid in a closed position. This latch consists of an ordinary spring-pressed bolt 39 secured to the front edge of the lid and adapted to enter a keeper 40 fixed to the bar 11 of the frame or edging to which the lid is secured. The bolt is drawn back or retracted by means of a thumb piece 41 and it is to this thumb piece that the end of the rope 35 is secured, the rope first rendering under a pulley 42 arranged upon the upper side of the lid just back of the thumb piece.

The operation is as follows:—Assuming the lid 10 to be closed, thereupon pressure being applied to the treadle 36 the bolt 39 will first become retracted and then the lid will be lifted to an open position. The animal is then introduced into the inner receptacle of the cage and if possible is placed therein in a manner whereby its fore feet will rest upon one of the plates 20 and its hind feet upon the other of these plates. Up to this time the lid of the cage is open and no current is passing through the cage. The foot of the operator is now released from the treadle and the lid drops into a closed position. When the lid becomes closed the primary electric circuit as aforesaid is applied by the contact of the fingers 30 with the spring contact members 24 and 25, respectively. The electrical connection being thus established through the primary circuit, connection will also be established through the secondary circuit by passing through the body of the animal resting upon the spaced plates 20 thereof, the animal forming the conducting medium between these plates and so completing the circuit.

The non-conducting bar 22 which extends crosswise the inner receptacle just adjacent the spaced ends of the conducting plates forming the floor of the receptacle has especial adaptability in that it prevents the foot of an animal entering between the spaced ends of the plates 20 which might cause a direct cross circuit between these plates which would not pass through the body of the animal.

The operation is one which can be very easily carried on owing in the first place to the fact that the lid is controlled by the foot of the operator, his hands being entirely free so that he is able to use both hands if necessary in handling the animal to be despatched. No current can pass through the cage until the lid is closed and after the lid is closed the inner receptacle or that portion of the cage through which the current is passing is absolutely insulated from the exterior of the cage or that portion thereof with which the operator might come in contact.

The construction and arrangement of the cage have also sanitary advantages in that access is readily had to the interior of the inner receptacle and especially the bottom thereof for purposes of cleansing. In such case the non-conducting bar 22 is first removed when the plates 20 may be turned to a raised position alongside the ends of the receptacle when access is had to the bottom thereof.

Having thus fully described my invention, I claim and desire to secure by Letters Patent of the United States:—

1. In an electrocuting apparatus for animals, a cage having a receptacle of some non-conducting material, separate floor plates of some conducting material in the bottom of said receptacle with spaced adjacent edges, other connections in circuit with said plates, and a crossbar of some non-conducting material arranged above said plates adjacent the spaced edges thereof.

2. In an electrocuting apparatus for animals, a cage having a receptacle of some non-conducting material, fixtures of some conducting material secured to the ends of said receptacle, spaced floor plates of some conducting material in the bottom of said receptacle and loosely connecting with said fixtures, and other connections in circuit with said fixtures.

3. In an electrocuting apparatus for animals, a cage having a receptacle of some non-conducting material, a lid through which entrance is had to the chamber of said receptacle, separate spaced floor plates of some conducting material in the bottom of said receptacle, other connections in circuit with said plates, the same comprising in part separate electric contact-forming members adjacent said lid when in a closed position, and means carried by said lid whereby the circuit may be completed between said members when said lid is closed.

4. In an electrocuting apparatus for animals, a cage comprising in part a receptacle of some non-conducting material having an open top, an outer receptacle enveloping said inner receptacle, the same being spaced and insulated therefrom and provided with a lid covering the opening into said inner receptacle, separate spaced floor plates of some conducting material in the bottom of said inner receptacle, and other connections in circuit with said plates.

5. In an electrocuting apparatus for animals, a cage having a receptacle of some non-conducting material with an opening into the same, spaced floor plates of some conducting material in the bottom of said receptacle, connections in circuit with said plates, a lid controlling the opening into said receptacle, and a foot-operated device for controlling said lid.

6. In an electrocuting apparatus for animals, a cage having a receptacle of some non-conducting material, a lid through which entrance is had to the chamber of said receptacle, separate spaced floor plates of some conducting material in the bottom of said receptacle, other connections in circuit with said plates, the same comprising in part separated contact-forming members, means whereby the circuit may be completed between said members when said lid is in a closed position, and a foot operated device for controlling said lid.

HUNTINGTON SMITH.

Witnesses:
John E. R. Hayes,
M. E. Flaherty.